(12) United States Patent
Arnetoli

(10) Patent No.: US 6,851,191 B2
(45) Date of Patent: Feb. 8, 2005

(54) REEL FOR WINDING A CUTTING CORD FOR A GRASS-CUTTING DEVICE AND HEAD FOR GRASS-CUTTING DEVICE INCORPORATING SAID REEL

(75) Inventor: Fabrizio Arnetoli, Florence (IT)

(73) Assignee: Arnetoli Motor Di Arnetoli Fabrizio, Firenze (IT)

(*) Notice: Subject to any disclaimer, the term of this patent is extended or adjusted under 35 U.S.C. 154(b) by 189 days.

(21) Appl. No.: 10/169,322

(22) PCT Filed: Dec. 28, 2000

(86) PCT No.: PCT/IT00/00553
§ 371 (c)(1),
(2), (4) Date: Jun. 26, 2002

(87) PCT Pub. No.: WO01/49101
PCT Pub. Date: Jul. 12, 2001

(65) Prior Publication Data
US 2002/0194736 A1 Dec. 26, 2002

(30) Foreign Application Priority Data
Jan. 4, 2000 (IT) .................................... FI2000A0001

(51) Int. Cl.[7] ............................................. A01D 34/416
(52) U.S. Cl. ......................................... 30/276; 30/347
(58) Field of Search ................... 30/276, 347; 56/12.7, 56/294

(56) References Cited

U.S. PATENT DOCUMENTS

| | | | |
|---|---|---|---|
| 4,183,138 A | | 1/1980 | Mitchell et al. ............... 30/276 |
| 4,274,201 A | | 6/1981 | Oberg et al. .................. 30/276 |
| 4,476,632 A | * | 10/1984 | Proulx .......................... 30/276 |
| 4,823,465 A | * | 4/1989 | Collins ......................... 30/276 |
| 4,897,923 A | * | 2/1990 | Collins ......................... 30/276 |
| 5,020,223 A | * | 6/1991 | Desent et al. ................. 30/276 |
| 5,461,787 A | * | 10/1995 | Araki et al. ................... 30/276 |
| 5,749,148 A | * | 5/1998 | White et al. .................. 30/276 |

FOREIGN PATENT DOCUMENTS

| | | |
|---|---|---|
| EP | 0 203 011 A2 | 11/1986 |
| EP | 0 467 006 B1 | 1/1992 |
| EP | 0 585 720 A1 | 3/1994 |
| FR | 2 623 365 A1 | 5/1989 |
| GB | 2 078 075 A | 1/1982 |

\* cited by examiner

*Primary Examiner*—Hwei-Siu Payer
(74) *Attorney, Agent, or Firm*—McGlew and Tuttle, P.C.

(57) ABSTRACT

A reel (1) for winding a cutting cord for a grass-cutting device is described, said reel comprising a first and a second series of axially and angularly staggered teeth and, having constrained with it, an axially movable slider (21) provided with a toothing (23) cooperating with the first and the second series of teeth.

33 Claims, 9 Drawing Sheets

REEL FOR WINDING A CUTTING CORD FOR A GRASS-CUTTING DEVICE AND HEAD FOR GRASS-CUTTING DEVICE INCORPORATING SAID REEL

TECHNICAL FIELD

The present invention relates to a reel for winding a cutting cord for a grass-cutting device in general. The invention also relates to a head for a grass-cutting device of the type comprising a reel onto which the cutting cord is wound.

In the present description and the accompanying claims, "grass-cutting device" is understood as referring to any device suitable for cutting vegetation.

STATE OF THE ART

In the sector of machinery and devices for cutting vegetation, for example grass, shrubs or the like, cord-cutting heads, i.e. those in which a cutting cord or several cutting cords wound onto a reel project with their ends from a rotating head, are frequently used. The portion or portions of cord projecting from the rotating head cut the vegetation, being tensioned by the centrifugal force.

The cutting cord is subject to wear and therefore numerous devices have been designed in order to allow lengthening of the portions of cutting cord projecting from the head in order to restore the length thereof following wear. Some of these devices are provided with a slider sliding inside a seat formed in the head and projecting from said head. This slider has a toothing which cooperates with a double series of teeth on the reel. Each travel movement of the slider produces lengthening of the cutting cord by a predetermined amount. A resilient member biases the slider into the position projecting with respect to the head. In other cases the slider is seated inside a cowl covering the head and is acted on by a member operated remotely, for example by means of a pull cable, the operating end of which is associated with the handlebar of the machine on which the grass-cutting head is mounted. A device of this type is described, for example, in EP-B-0 467 006.

In these devices removal of the reel from the head involves disassembly of numerous parts. Reassembly of these parts is complex and requires time as well as a certain manual dexterity. Production of the device is relatively costly owing to the large number of parts which form it.

OBJECTS AND SUMMARY OF THE INVENTION

An object of the present invention is to provide a reel for a cutting cord to be used in a grass-cutting head, which overcomes the drawbacks of the conventional art.

Another object of the invention is to provide a grass-cutting head which avoids the limitations, costs and complexities of the conventional devices.

These and further objects and advantages, which will be obvious to persons skilled in the art from reading of the text which follows, are obtained essentially by means of a reel which comprises a first and a second series of axially and angularly staggered teeth and with which the slider is directly constrained, which slider is axially movable and provided with a toothing cooperating with the first and the second series of teeth of the reel.

In this way, the slider and the reel form an assembly which may be easily inserted into the head and removed therefrom. As will emerge clearly from the following description of some examples of embodiment, a simple, compact and economical design, which is easy-to-use and low-cost, is obtained.

In practice, the first and the second series of teeth on the reel may be formed inside an axial hole provided in said reel, the slider being seated in said axial hole. In order to prevent the slider from coming out of the reel and to define a maximum projecting position thereof, a suitable retaining system, for example in the form of a retaining edge, may be provided. Instead of a retaining edge, lugs projecting radially toward the inside of the axial hole of the reel may be provided. The retaining edge or other system may cooperate with the toothing of the slider so as prevent it from coming out of the axial hole of the reel.

During use, when the head in which the reel is seated rotates, the reel must be angularly coupled with the head, except during the cord lengthening operations. For this purpose, a torsional coupling surface is provided. The latter may be formed on the reel, but is preferably formed on the slider since, by so doing, a broader coupling surface and therefore a reduction in the stress on said coupling surface is achieved. Said surface may have any configuration and may be formed, for example, as a prism-shaped surface inside the slider. Alternatively, the slider may have on its external surface grooves cooperating with lugs formed in the head into which the reel is inserted. Equivalent configurations are also possible, provided that they are characterized by the presence of a torsional coupling surface, i.e. a surface which torsionally constrains the slider with the head inside which the reel is inserted. The latter is able to rotate with respect to the head and with respect to the slider when the toothing of the slider is disengaged from one of the two series of teeth so as to engage with the other series of teeth of the reel to allow lengthening of the cutting cord.

When inserted into the reel, the slider is resiliently biased into a maximum projecting position with respect to the reel, where its toothing cooperates with one of the two series of teeth provided in said reel. For this purpose a resilient member is used. The latter may be inserted into the axial hole of the reel and be retained between the slider and a surface of the head. However, according to a particularly advantageous embodiment, the resilient member is preferably stably seated inside the reel so that the latter may be inserted into the head and removed from the latter without the need for assembly and disassembly of the resilient member every time, said member remaining inside the reel.

For this purpose, according to a particularly advantageous embodiment of the invention, the end of the axial hole opposite to that from which the slider projects is provided with a stop for retaining the resilient member, which thus remains compressed between the retaining stop and the slider. In this case, the reel is formed as two parts joined together. Joining may be stable and irreversible, for example by means of bonding, welding or another system.

However, according to a preferred embodiment of the invention, joining is reversible and therefore the two joined portions may be separated from each other so as to allow extraction of the resilient member. This is particular advantageous for recycling purposes. In fact, whereas the slider and the reel are made of plastic material, the resilient member is normally a helical spring made of metal wire. The spring is therefore preferably separated from the plastic material so as to allow easy recycling of the materials.

The retaining stop provided at the end of the axial hole opposite to that from which the slider projects may also be provided solely to prevent the slider from coming out of this end, while the resilient member has dimensions such as not to be retained inside the reel. In this case, it will be compressed between the slider and a part of the head inside which the reel is inserted.

When the reel is formed as two portions which can be joined together in a reversible manner, joining is preferably performed in the axial direction, it being envisaged that the reel is divided into two portions, each of which comprises a flange and an intermediate cylindrical wall. The two cylindrical walls are inserted one inside the other and form the central body of the reel inside which the axial hole is formed. The cutting cord or cutting cords are wound around the central wall so as to form the coils of cord which are retained between the two flanges of the two portions axially joined together.

Joining may be performed by means of resilient tongues which are formed on one of the two portions into which the reel is divided, which tongues are inserted into notches, holes or eyelets formed in the other of said two portions.

Further advantageous embodiments of the reel according to the invention are indicated in the accompanying claims which are described with reference to a few examples of embodiment.

The invention also relates to a cord-type grass-cutting head comprising a seat with through-holes for the cutting cord and, in said seat, a reel onto which the cutting cord is wound, characterized in that the reel is constructed in the manner described above.

Further characteristic advantages of the head according to the invention are indicated in the accompanying claims and will be described in greater detail with reference to the examples of embodiment illustrated in the accompanying drawings.

BRIEF DESCRIPTION OF THE DRAWINGS

The invention will be better understood with reference to the description and the attached drawing which shows a practical nonlimiting embodiment of said invention. In the drawing.

DETAILED DESCRIPTION OF EMBODIMENTS OF THE INVENTION

Figure 1:
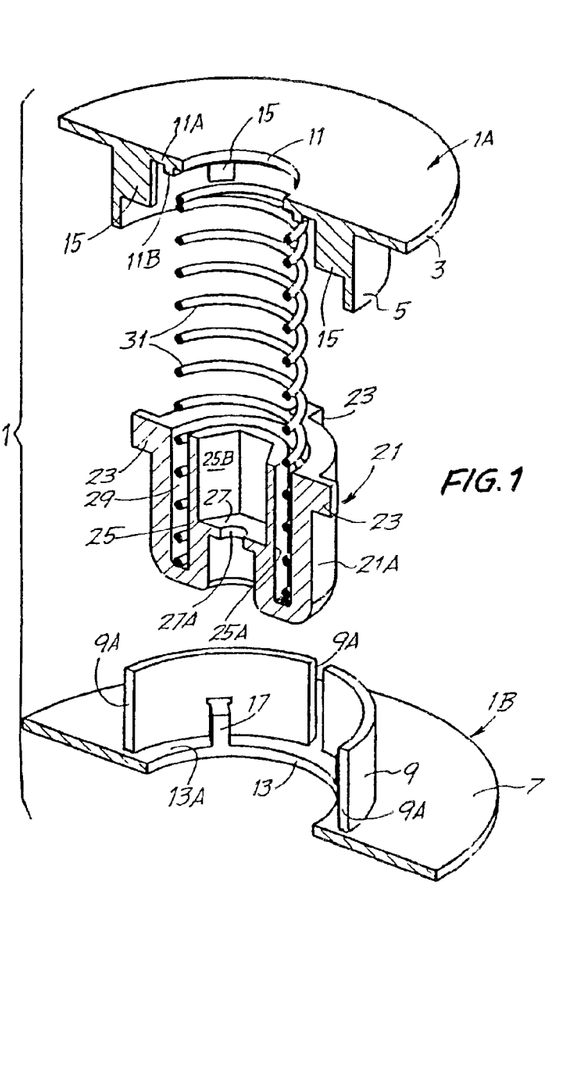
FIG. 1 shows an exploded and split perspective view of a reel according to a first embodiment.
Figure 2:
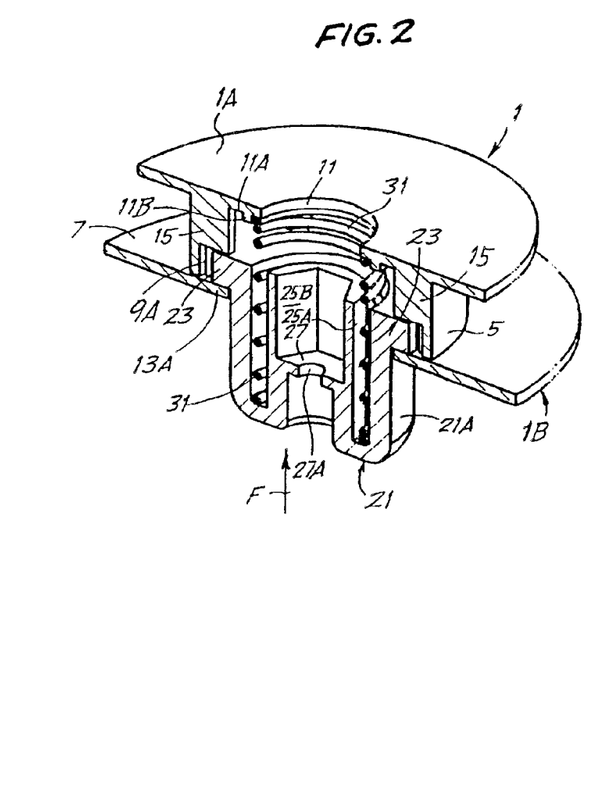
FIG. 2 shows again a split perspective view of the reel in FIG. 1 in the assembled condition.

A first embodiment of the reel according to the invention is shown in FIGS. 1 and 2, where the reel is cut in half so as to show, sectioned, the internal components thereof. The reel, which is generally denoted by 1, comprises two portions 1A and 1B which are shown in the condition separated from one another in FIG. 1 and assembled together in FIG. 2. The portions 1A and 1B are joined together in the axial direction.

The portion 1A has a disk-shaped flange 3 and a cylindrical wall 5 coaxial with the flange 3. Similarly, the portion 1B has a flange 7 and a cylindrical wall 9. In the assembled condition, the cylindrical wall 9 is located inside the cylindrical wall 5, as shown in the split view in FIG. 2.

The two cylindrical walls 5 and 9 define the central body of the reel which is provided with an axial hole. The flange 3 has an upper opening 11 coaxial with the central body of the reel, while the flange 7 of the portion 1B has an opening 13.

The opening 11 is defined by a stop formed by an internal annular flange 11A. The latter is equipped, on the side directed toward the inside of the reel, with an annular projection 11B, for the purposes indicated below. The opening 13 is delimited in turn by an annular edge 13A.

As can be seen in particular in the exploded view in FIG. 1, a first series of teeth 15 formed on the inner surface of the cylindrical wall 5 is associated with the upper portion 1A of the reel. Similarly, teeth 17 of a second series of teeth are formed on the inner surface of the cylindrical wall 9. The teeth 15 and 17 are angularly staggered when the positions 1A and 1B are joined together. They are also axially staggered in the sense that the teeth 15 of the first series extend axially toward the lower portion 1B of the reel 1 over an axial length such as not to extend substantially beyond the point at which the teeth 17 of the second series start.

In the assembled condition, the teeth 15 of the portion 1A of the reel project inside the cylindrical wall 9 via axial slits 9A formed in said wall.

A slider 21 is seated inside the axial hole formed in the reel 1 and delimited by the cylindrical walls 5 and 9. Said slider has a toothing 23 along its upper edge. In the assembled condition, this toothing 23 rests on the annular edge 13A which forms an edge for retaining the slider, which is thus retained inside the reel. The slider 21 has a substantially cylindrical external surface 21A inside which and coaxially with which an internally hollow body 25 with a cylindrical external surface 25A and an internal surface 25B with a hexagonal cross section extends. A diaphragm 27 provided centrally with a hole at 27A is located in a middle position along the axial extension of the body 25.

A seat 29 with an annular cross section for seating a resilient member consisting of a helical compression spring 31 is thus defined between the external wall of the slider 21 and the body 25. Said spring is housed inside the axial hole of the reel and compressed between the flange 11A of the upper portion 1A of the reel and the bottom of the slider 21, as can be clearly seen in FIG. 2. The annular projection 11B formed on the flange 11A retains, in cooperation with the seat 29, the resilient member 31 in the correct position.

In the assembled condition, therefore, the slider 21 is able to slide inside the axial hole of the reel when it is pushed in the direction of the arrow F (FIG. 2), compressing the resilient member 31. In this way, the toothing 23 of the slider 21 is displaced from a position where it is located at the same height as the series of teeth 17 into a position where it is located aligned with the series of teeth 15.

When the reel is inserted into a head and a cutting cord is wound thereon, the alternating movement of the slider 21 allows lengthening of the cutting cord owing to the centrifugal force of the head which is rotating, as will be explained in greater detail with reference to FIGS. 11 to 17.

Figure 3:
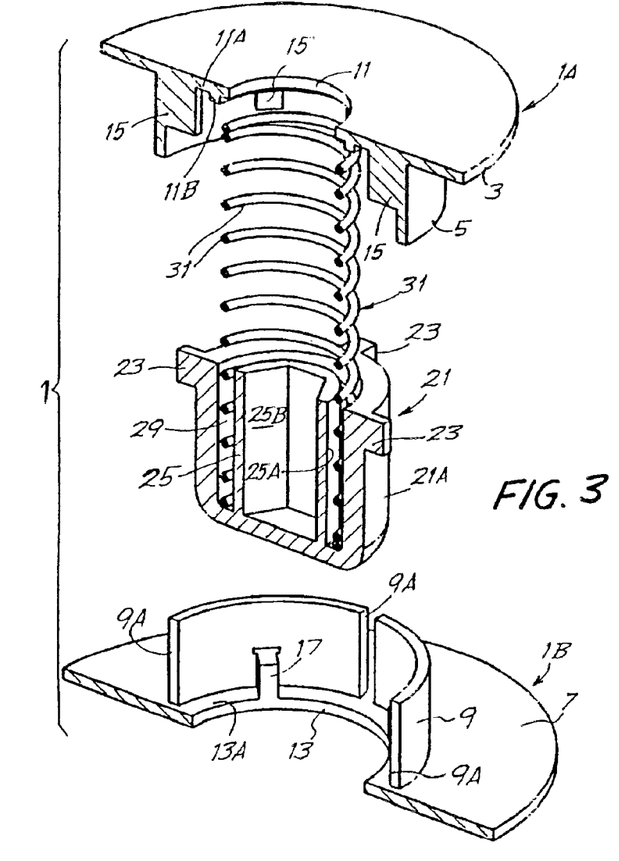
FIGS. 3 and 4 show, similar to FIGS. 1 and 2, a different embodiment of the reel according to the invention.
Figure 4:
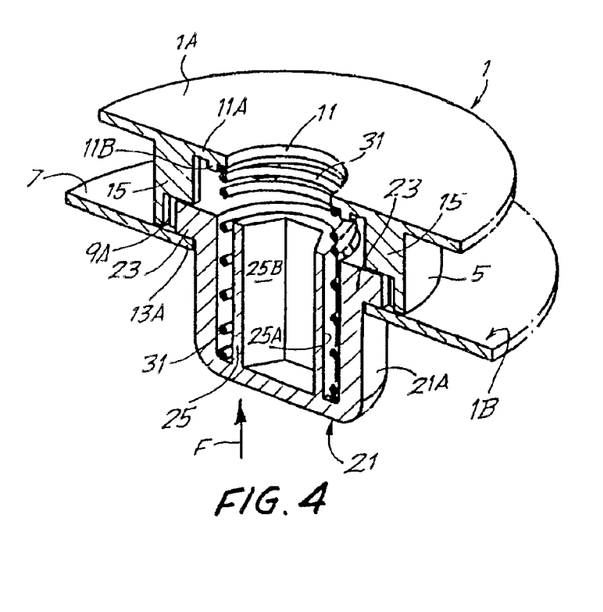

FIGS. 3 and 4 show a reel which is similar to that in FIGS. 1 and 2 and which differs from the latter with regard to the form of the inner part of the slider 21. The same numbers denote parts which are the same as or correspond to those of the reel in FIGS. 1 and 2. In FIG. 3, the body 25 which is located inside the slider 21 does not have the diaphragm 27, but solely an internal cavity with a hexagonal cross section which is closed at the bottom by the end wall of said slider 21.

Assembly of the two portions 1A and 1B of the reel 1 and of the slider 21 with the respective resilient member 31 is performed in a manner similar to that already described.

Figure 5:
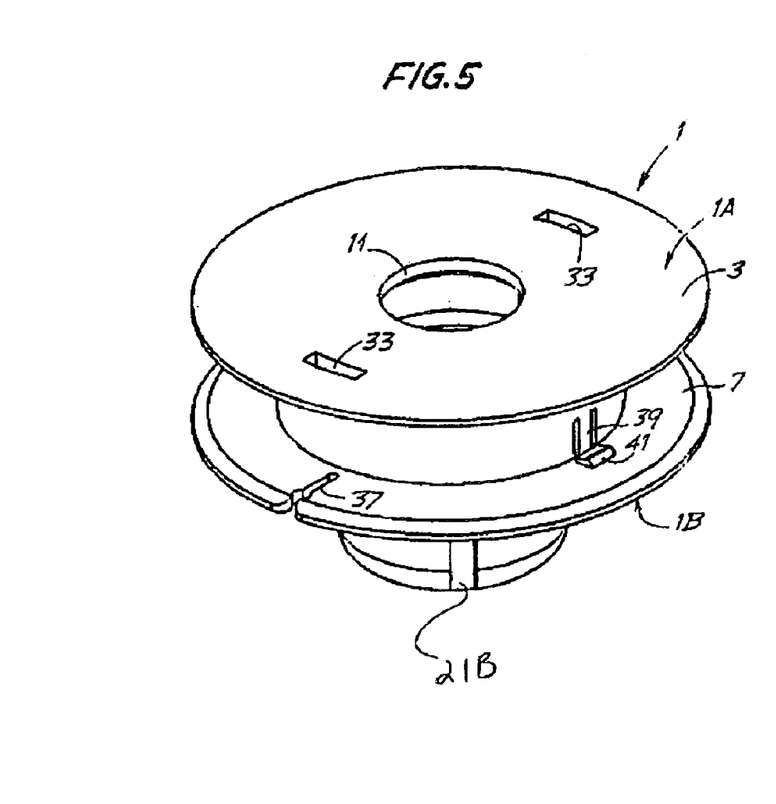
FIGS. 5 and 6 show a perspective view of a reel from above and from below in the assembled condition.
Figure 6:
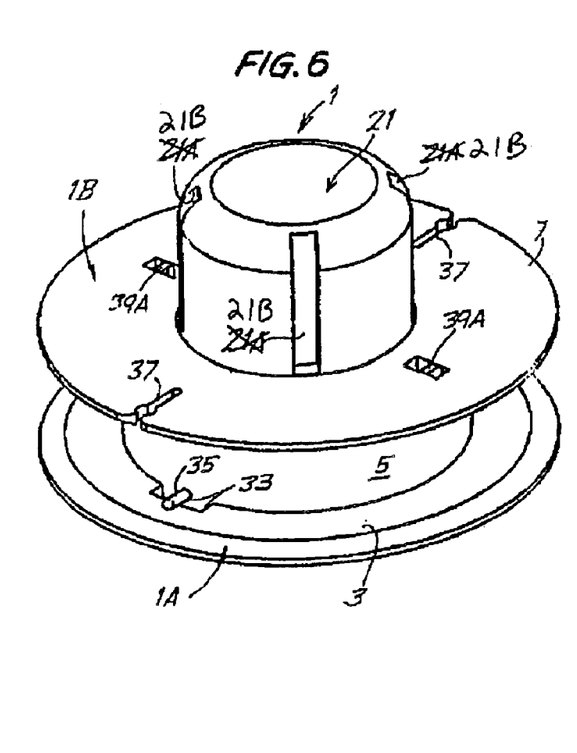

The portions 1A and 1B of the reel may be joined together in an irreversible manner, for example by means of bonding, welding (advantageously ultrasound welding) or in any other suitable manner. According to a preferred embodiment, however, joining is performed using reversible means which allow separation of the two portions 1A and 1B, as illustrated in FIGS. 5 and 6. These Figures show a perspective view from above and a perspective view from below of a reel similar to that in FIGS. 3 and 4, but with illustration of some accessory parts which may be present both on the reel in FIGS. 3 and 4 and on the reel in FIGS. 1 and 2. The same numbers denote parts which are the same as or correspond to those in FIGS. 1, 2, 3 and 4.

In addition to a chamfer provided along the edge of the flange 3, the reel in FIGS. 5 and 6 has—in addition to that shown in the preceding figures—a system for securing the cord which is to be wound onto the reel. This system is denoted by 33 and consists, in this example, of through-slits formed in the flange 3 of the portion 1A. A pin 35 extends transversely with respect to the slits 33 (see FIG. 6). The cord is secured to the reel by passing it into the two openings left free by the transverse pin 35 inside the slit 33. Systems of this type and other equivalent systems are known per se and any securing system maybe advantageously used on the reel according to the invention.

FIGS. 5 and 6 also show means for engaging the free ends of the cord wound onto the reel in order to facilitate insertion of the reel into the head of the grass-cutting device. These engaging means are provided in this example in the form of radial incisions 37 formed in the flange 7 of the portion 1B. The terminal ends of the cutting cord are inserted and retained inside the incisions 37 in a manner known per se.

FIGS. 5 and 6 also show a possible embodiment of means for reversible connection of the portions 1A and 1B forming the reel 1. These connection means consist of resilient tongues 39 formed in the cylindrical wall 5 of the portion 1A of the reel 1. The tongues 39 terminate in teeth 39A which engage in notches 41 formed in the flange 7 of the portion 1B of the reel 1. The notches 41 are open on the side of the flange 7 opposite to the side directed toward the flange 3, allowing in this manner access to the terminal teeth 39A of the tongues 39 and therefore the mutual disengagement of the two portions 1A and 1B.

FIGS. 5 and 6 illustrate, moreover, the possibility of forming on the external surface of the slider 21 axial grooves 21B, for the purposes which will be clarified below with reference to FIGS. 11 to 17.

Figure 7:
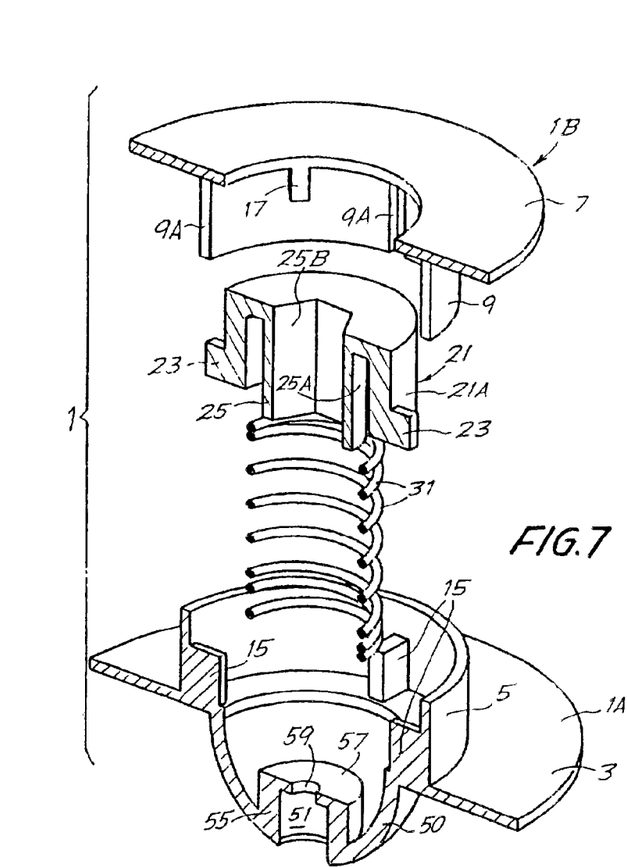
FIGS. 7 and 8 show, similar to FIGS. 1 and 2, a third embodiment of the reel.
Figure 8:
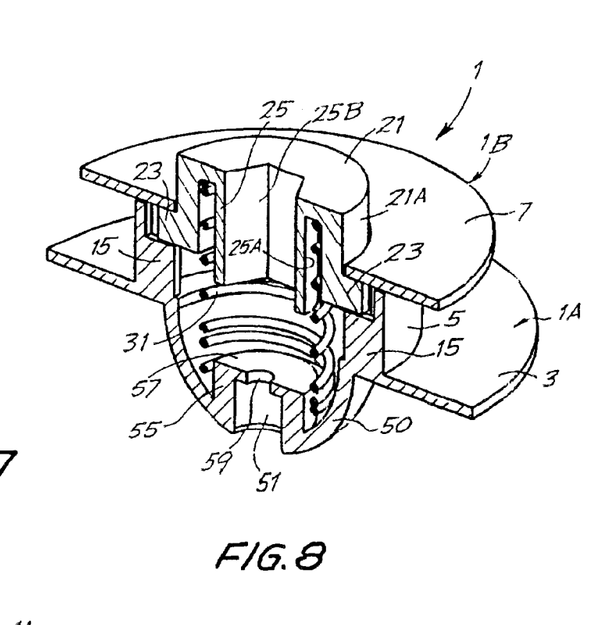

FIGS. 7 and 8 show a variation of embodiment of the reel according to the invention. The same numbers denote the same or corresponding parts. The reel in FIGS. 7 and 8 differs from the reel in the preceding figures in that the portion 1A has a protuberance 50 in the form of a cap. The protuberance 50 has an axial hole 51 defined by a cylindrical wall 55 having a bottom 57 with a through-hole 59 coaxial with the hole 51. The cylindrical wall 55, together with the wall of the cap 50, defines a seat for retaining the resilient member 31 which performs the function of the annular projection 11B in FIGS. 1 to 4.

The slider 21 has, in this example of embodiment, a central body 25 with an axial hole, the side surface 25B of which has a hexagonal cross section. The axial hole defined by the hexagonal wall 25B is a through-hole and has a constant cross section over its whole extension.

In FIGS. 7 and 8, the portions 1A and 1B are shown in the inverted condition, in the sense that the portion 1A indicated above as upper portion is now located in the lower position. This corresponds to a different assembly of the reel in the cutting head, as will be clarified with reference to FIGS. 11 to 17.

Figure 9:
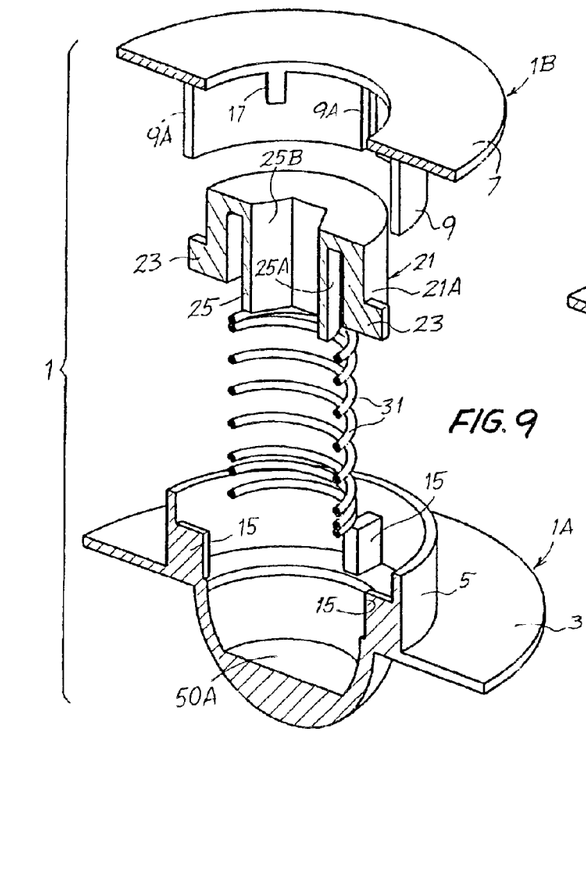
FIGS. 9 and 10 show, similar to FIGS. 7 and 8, a variation of the reel.
Figure 10:
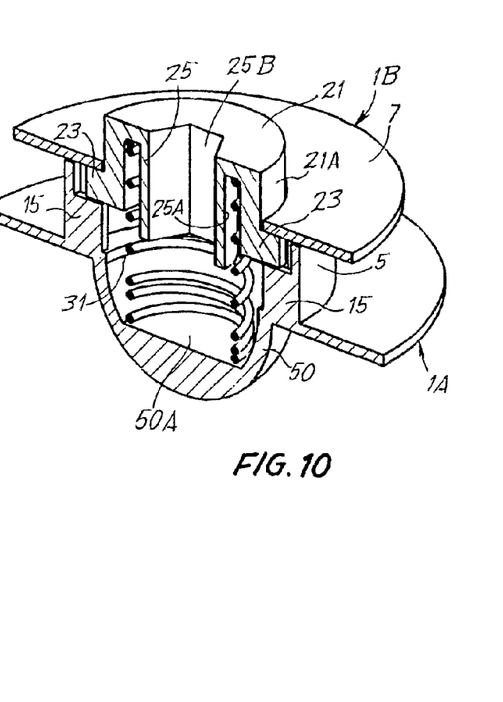

FIGS. 9 and 10 show a reel which is similar to that shown in FIGS. 7 and 8 and which differs from the latter exclusively owing to the different form of the cap-shaped protuberance 50 which projects at the bottom from the portion 1A of the reel 1. In this case, in fact, the protuberance 50 has inside it a bottom wall 50A and is not provided with an axial hole. An annular projection (not shown) for laterally containing the resilient member 31 may be provided if necessary.

Figure 11:
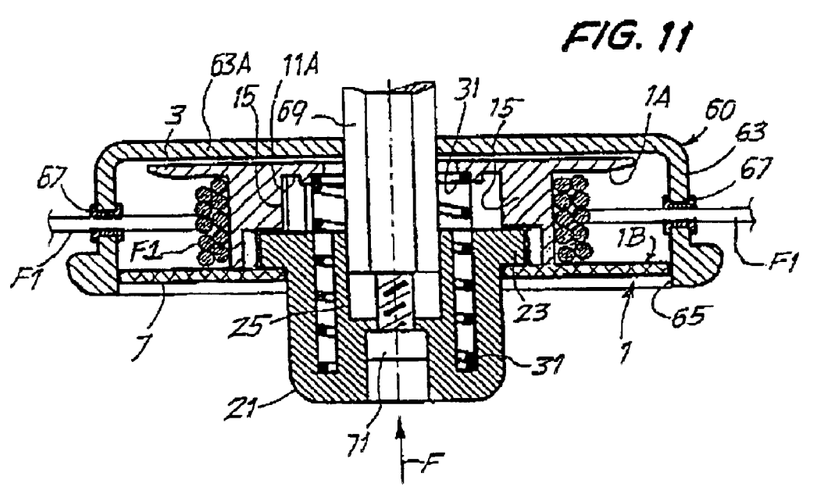
FIGS. 11 to 17 show, in longitudinal cross sections, heads using reels according to the preceding figures in various assembled conditions.

FIG. 11 shows a first method of mounting the reel according to the invention in a head of a grass-cutting device. The head of the grass-cutting device is generally denoted by 60 and in this embodiment comprises a seat defined by a cap-like member 63 with a bottom opening 65. Radial bushes 67 are inserted in the side wall of the cap 63 and, through them, the free ends of one or more cutting cords which are schematically indicated by F1 are inserted and wound onto the reel 1.

A hub 69 of the machine on which the head 60 is mounted passes through the upper wall 63A of the cap 63. The hub 69 has a hexagonal prismatic outer surface which is coupled with the surface 25B of the body 25 formed inside the slider 21. The hexagonal surfaces 25B of the body 25 of the slider 21 and of the hub 69 form a torsional coupling which allows the rotational movement of the hub 69 to be transmitted to the slider 21 and from the latter, via the toothing 23 and the series of teeth 17, to the reel 1. Said hexagonal surface of the hub 69 forms a torsional coupling with the hole with a hexagonal cross section formed in the upper wall 63A of the cap 63, so as to cause rotation of said cap.

Axial retention of the reel, and consequently of the head 60, is achieved in this example of embodiment by means of a screw 71 which passes through the hole 27A in the diaphragm 27 of the slider 21 and engages in a threaded hole of the hub 69.

During operation of the head, the portions of cord F1 projecting from the bushes 67 break and are subject to wear, with the consequent need for restoration thereof. For this purpose, the slider 21 is pressed in the direction of the arrow F so that the toothing 23 of the slider 21 is disengaged from the teeth 17, assuming an axial position corresponding to that of the teeth 15 of the reel. Consequently, the reel rotates owing to the tractional effect due to the centrifugal force of the cords F1 through an angle corresponding to the angular phase-displacement between the teeth 17 and the teeth 15. The reverse movement of the slider 21 produces disengagement of the toothing 23 from the teeth 15 and restoration of the position shown in FIG. 11, with the consequent further rotation of the reel by a further amount corresponding to the angular phase-displacement of the teeth 15 and 17. A lengthening of the cutting cord is thus obtained with each movement of the slider 21 in the two directions.

Figure 12:
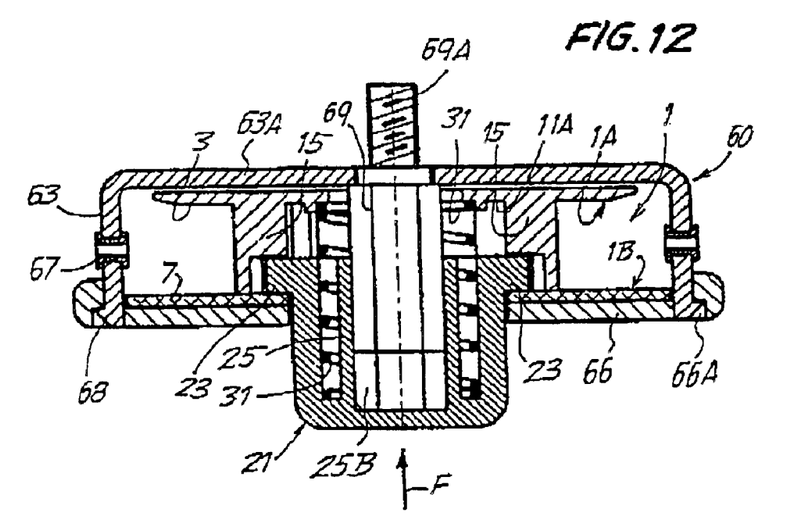

In the embodiment in FIG. 12, the same reel 1 is mounted in a head, again denoted by 60, similar to the head in FIG. 11, but equipped with a bottom cover 66. The reel differs from that in FIG. 11 owing to the different configuration of the slider 21. The reel in FIG. 11 has the form illustrated in FIGS. 1 and 2, whereas the reel in FIG. 12 has the form illustrated in FIGS. 3 and 4. The bottom cover 66 of the head 60 engages along the edge of the side wall of the cap 63 by means of resilient tongues 68 which engage in slits 66A of the cover 66 or in another manner. The screw 71 for locking the slider and therefore the reel in the head 60 is therefore not necessary. Torsional coupling between the hub 69 and the reel is again achieved by means of the hexagonal surface of the hub 69 and the hexagonal surface 25B of the body 25 formed inside the slider 21. The hub 69 has in this example of embodiment a threaded pin 69A which engages inside a threaded hole in the power drive of the strimmer, lawn mower or other type of grass-cutting device with which the head 60 is coupled. Torsional coupling between the head 60 and the power drive may be obtained by means of fastening achieved with the threaded pin 69A or in another suitable manner.

Figure 13:
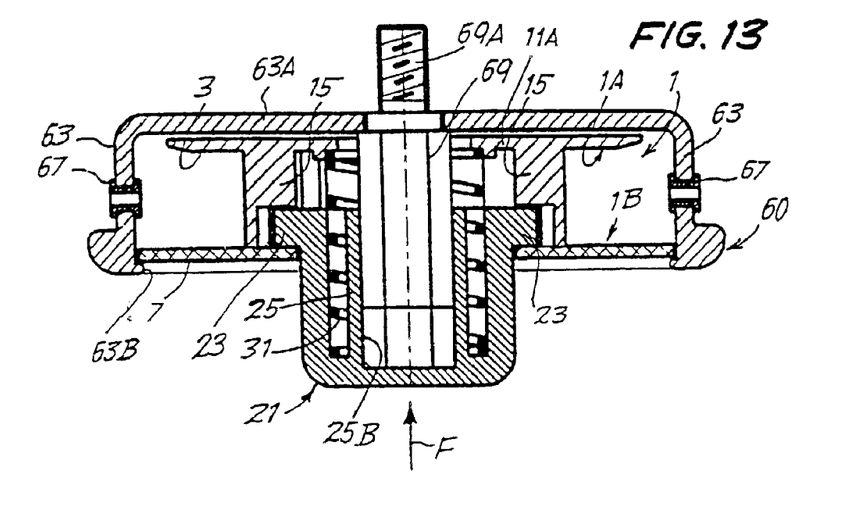

FIG. 13 shows the assembly consisting of the head 60 and of the same reel as FIG. 12 (shown in detail in FIGS. 3 and 4). The head in FIG. 13 differs from the head in FIG. 12 in that the bottom cover 66 is not provided. In this case, axial retention of the reel 1 inside the head is achieved by means of an internal annular rim 63B provided along the bottom opening of the cap 63 forming the head 60. Torsional coupling of the reel and of the head with the hub 69 may be achieved using one of the systems described above.

Figure 14:
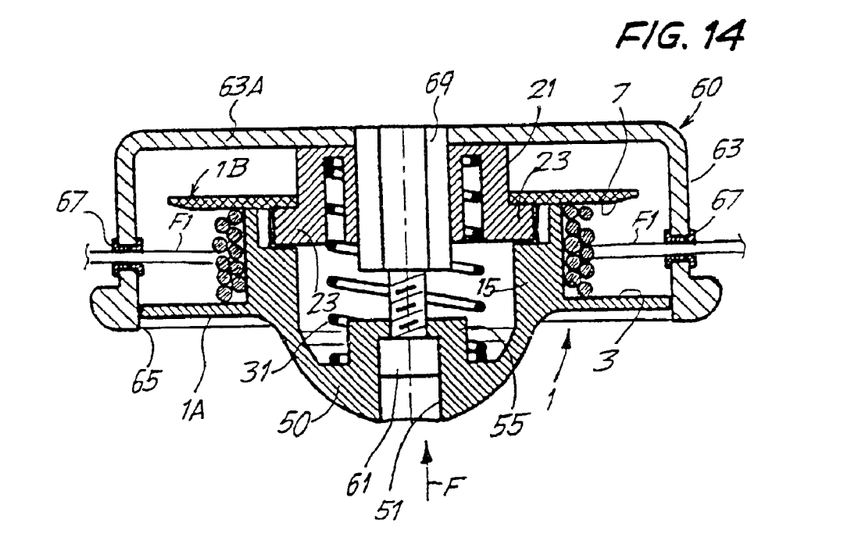
Figure 15:
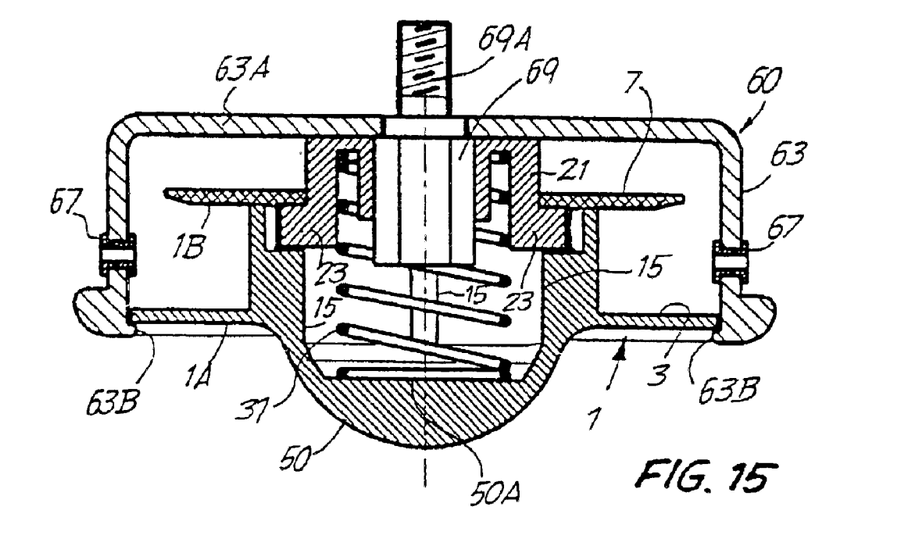
Figure 16:
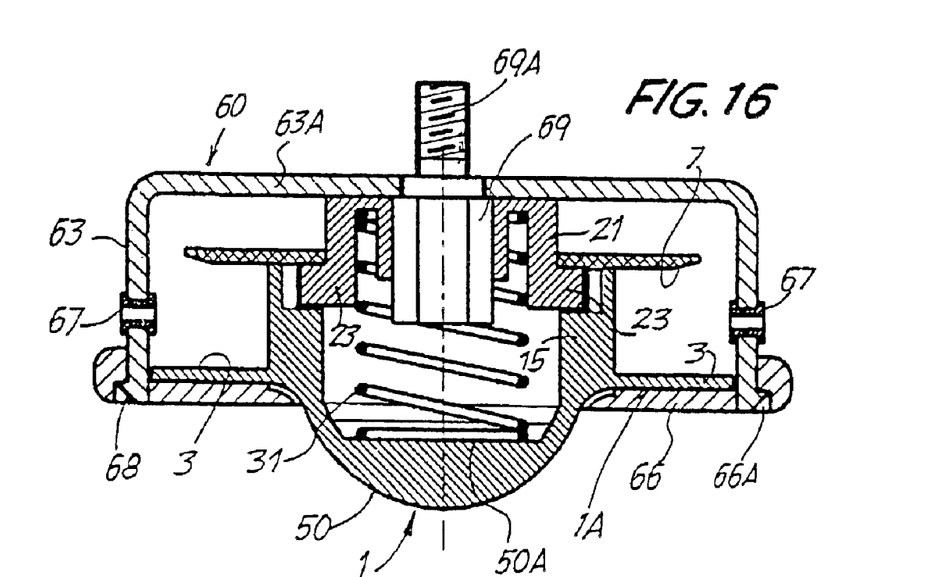

FIGS. 14, 15 and 16 show different methods of assembly of a reel of the type illustrated in FIGS. 7 to 10 in various types of head.

More particularly, FIG. 14 shows a head similar to that in FIG. 11. The reel 1 is mounted in this case so that the portion 1A thereof is directed downward such that the protuberance 50 projects beyond the bottom opening 65 of the head 60. The slider 21 rests on the inner surface of the upper wall 63A of the cap 63 forming the head 60. The lengthening movement of the cutting cord is obtained in this case by pressing the protuberance 50 on the ground during rotation of the head. This causes a raising and subsequent lowering movement of the entire reel with respect to the slider 21 (due to the effect of the resilient member 31), the slider in this case remaining axially fixed with respect to the head 60.

Axial locking of the reel 1 is performed by means of the screw 61 which in this case passes through the hole 51 in the protuberance 50 and through the hole 59 in the bottom wall 57.

FIG. 15 shows the assembly of a reel of the type illustrated in FIGS. 9 and 10 on a head similar to the head in FIG. 13. Axial retention of the reel 1 in the head is also performed in this case by means of the edge 63B surrounding the bottom opening of the side wall of the cap 63 forming the head 60.

FIG. 16 shows the assembly of the reel in FIGS. 9 and 10 on a head of the type corresponding to that shown in FIG. 12. Axial retention of the reel 1 is performed by means of the bottom cover 66.

Figure 17:
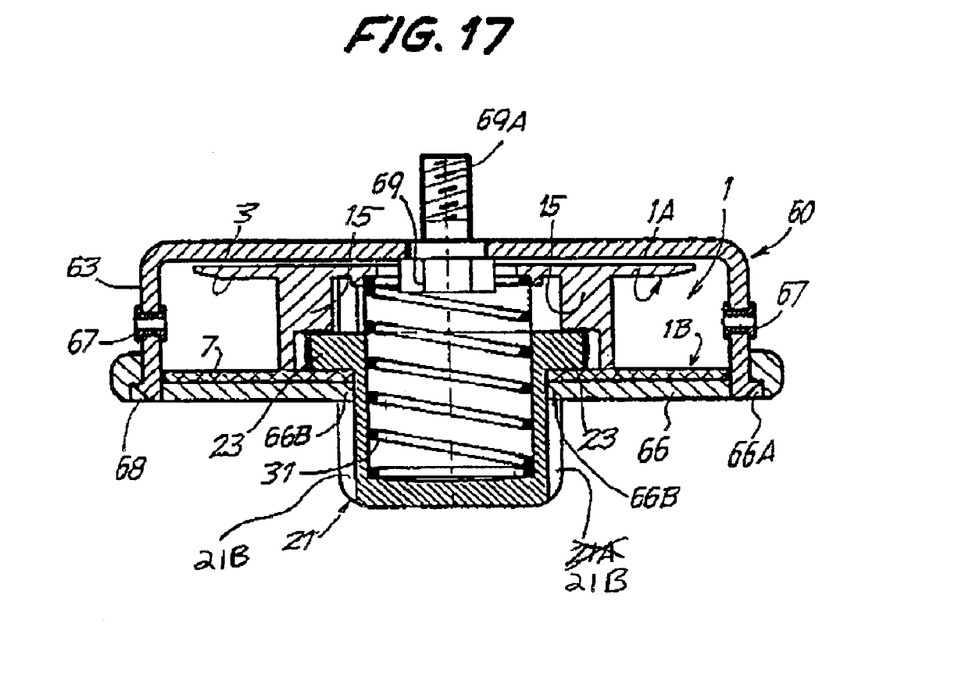

FIG. 17, finally, shows a system for assembling a reel 1 in which torsional coupling between the reel and the head is performed in the region of the slider 21. The latter has (as shown in FIGS. 5 and 6 and described above) longitudinal grooves 21B. Toothings 66B formed in the cover 66 of the head 60, which moreover has a form equivalent to that in FIG. 12, engage in said grooves. In this way, the rotary movement is transmitted from the hub 69 to the slider 21 and from the latter via the toothing 23 to the reel 1 and via the grooves 21B and the toothings 66B to the head 60.

It must be made clear that FIGS. 11 to 17 show only some of many methods of using a reel according to the invention. The latter may in fact be used in heads of various types which are coupled in different ways with the power drive of the machine on which they are mounted. The methods for coupling and transmission of the power depend, among other things, on the type of machine (with an internal combustion engine or with an electric motor), on the dimensions of the head, on the resistance characteristics, etc.

It is understood that the drawing shows only an example provided by way of practical demonstration of the invention, it being possible to vary the forms and arrangements of said invention without however departing from the scope of the idea underlying said invention. The presence of any reference numbers in the accompanying claims has the purpose of facilitating reading of the claims with reference to the description and the drawing and does not limit the scope of protection represented by the claims

What is claimed is:

1. A reel for winding a cutting cord for a grass-cutting device, comprising a first and a second series of axially and angularly staggered teeth, characterized in that an axially movable slider provided with a toothing cooperating with said first and said second series of teeth is constrained with said reel, said reel defining an axial hole inside which said first and said second series of teeth are arranged and in which said slider is seated, an edge for retaining the slider, so as to prevent the slider from coming out of said axial hole of the reel, is provided at one end of said axial bole, from which said slider projects.

2. The reel according to claim 1, characterized in that said retaining edge cooperates with said toothing of the slider so as to prevent the slider from coming out of the axial hole of the reel.

3. The reel according to claim 1, characterized by a torsional coupling surface for torsionally constraining said reel with the head inside which it is inserted.

4. The reel according to claim 3, characterized in that said torsional coupling surface is formed in said slider.

5. The reel according to claim 1, characterized in that said slider has, associated with it, a resilient member which acts on said slider in order to bias resiliently said slider.

6. The reel according to claim 5, characterized in that said resilient member is seated in said axial hole.

7. The reel according to claim 6, characterized in that a retaining stop for preventing said slider from coming out is provided at another end of said axial hole, said resilient member is retained in said reel by said retaining stop, the resilient member being compressed between said retaining stop and said slider.

8. The reel according to claim 7, characterized in that said retaining stop is formed by an annular flange which projects radially toward the axis of the reel and along which an annular projection directed toward the inside of the hole of the reel and coaxial therewith is provided, said resilient member being a helical compression spring, said annular projection retaining laterally said helical spring.

9. The reel according to claim 5, characterized in that said resilient member is a helical compression spring.

10. The reel according to claim 1, characterized in that a retaining stop for preventing said slider from coming out is provided at another end of said axial hole.

11. The reel according to claim 1, characterized in that it is formed as two portions which are axially joined together.

12. The reel according to claim 11, characterized in that said two portions are joined together in a releasable manner.

13. The reel according to claim 12, characterized in that said two portions are joined together by means of resilient tongues engaging in corresponding notches.

14. The reel according claim 13, characterized in that a first of said two portions comprises a first flange and a first cylindrical wall coaxial with said first flange, the second of said two portions comprises a second flange and a second cylindrical wall coaxial with said second flange, said resilient tongues are fanned in said second cylindrical wall and in that said notches are formed in the first flange.

15. The reel according to claim 1, characterized by an axial protuberance opposite to said slider.

16. A cord-type grass-cutting head, comprising a seat with through-holes for a cutting cord and, in said seat, at least one reel onto which said cutting cord is wound, characterized in that said reel is a reel according to claim 1.

17. A reel for winding a cutting cord for a grass-cutting device, comprising a first and a second series of axially and angularly staggered teeth, characterized in that an axially movable slider provided with a toothing cooperating with said first and said second series of teeth is constrained with said reel, said reel being formed as two portions which are axially joined together, a first of said two portions including a first flange and a first cylindrical wall coaxial with said first flange, the second of said two portions including a second flange and a second cylindrical wall coaxial with said second flange, the first cylindrical wall having a diameter smaller than the second cylindrical wall and being inserted inside the latter, the second cylindrical wall forming a central body of the reel around which said cutting cord is wound so as to form a wound arrangement of cord between said two flanges.

18. The reel according to claim 17, characterized in that the first series of teeth is integral with said first cylindrical wall and said second series of teeth is integral with said second cylindrical wall, the first cylindrical wall having longitudinal openings for allowing the second series of teeth to pass through, said openings being angularly staggered with respect to the teeth of the first series of teeth.

19. A cord-type grass-cutting head, comprising a seat with through-holes for a cutting cord and, in said seat, at least one reel onto which said cutting cord is wound and comprising a first and a second series of axially and angularly staggered teeth, characterized in that an axially movable slider with a toothing cooperating with said first and said second series of teeth is constrained with said reel, said reel and said slider being shaped to form an assembly that can be simultaneously inserted into said seat and removed therefrom: said the reel including an axial hole inside which said first and said second series of teeth are arranged and in which said slider is seated.

20. The head according to claim 19, characterized in that said reel has a torsional coupling surface for torsionally constraining said reel with said head.

21. The head according to claim 20, characterized in that said torsional coupling surface is formed in said slider.

22. The head according to claim 19, characterized in that said reel is inserted in said head so that the slider projects from the seat of the head.

23. The head according to claim 19, characterized in that said reel has a protuberance projecting from the opposite side to the slider and in that it is mounted in said seat so that said protuberance projects from said seat.

24. The head according to claim 19, characterized in that a resilient member which acts on said slider in order to bias resiliently said slider into a position of maximum projection from the reel is associated with said slider.

25. The head according to claim 24, characterized in that said resilient member is seated in said axial hole of the reel and retained inside it by the slider and by a retaining stop integral with said reel.

26. The head according to claim 19, characterized in that said reel is formed as two portions which are axially joined together.

27. The head according to claim 26, characterized in that said two portions forming the reel are joined together in a removable manner.

28. The head according to claim 27, characterized in that said two portions of the reel are joined together by means of resilient tongues engaging in corresponding notches.

29. The head according to claim 19, characterized in that said slider has a retaining edge, said reel has, at the opposite end of the axial hole with respect to the retaining edge of the slider, a retaining stop for preventing the slider from coming out.

30. A cord-type grass-cutting head, comprising a seat with through-holes for a cutting cord and, in said seat, at least one reel onto which said cutting cord is wound and comprising a first and a second series of axially and angularly staggered teeth, characterized in that an axially movable slider with a toothing cooperating with said first and said second series of teeth is constrained with said reel, said reel defining an axial hole inside which said first and said second series of teeth are arranged and in which said slider is seated, an edge for retaining the slider is provided at one end of said axial hole in the reel.

31. A reel for winding a cutting cord torn grass-cutting device, comprising a first and a second series of axially and angularly staggered teeth, characterized in that an axially movable slider provided wit a toothing cooperating with said first and said second series of teeth is constrained with said reel, said reel and said slider being shaped to form an assembly that can be simultaneously inserted into the grass cutting device and removed therefrom.

32. A cutting device comprising:
  a reel defining a hole;
  a first and a second series of axially and angularly staggered teeth arranged inside said hole of said reel;
  a slider axially movable in said hole, said slider including a toothing cooperating with said first and second series of teeth;
  a retaining system on said reel and said slider for constraining said slider to said reel.

33. A device in accordance with claim 32, wherein:
  said retaining system directly connects said slider to said reel.

* * * * *